Feb. 13, 1934.  L. P. CROSMAN  1,946,572
LISTING CALCULATOR
Filed April 28, 1932    12 Sheets-Sheet 1
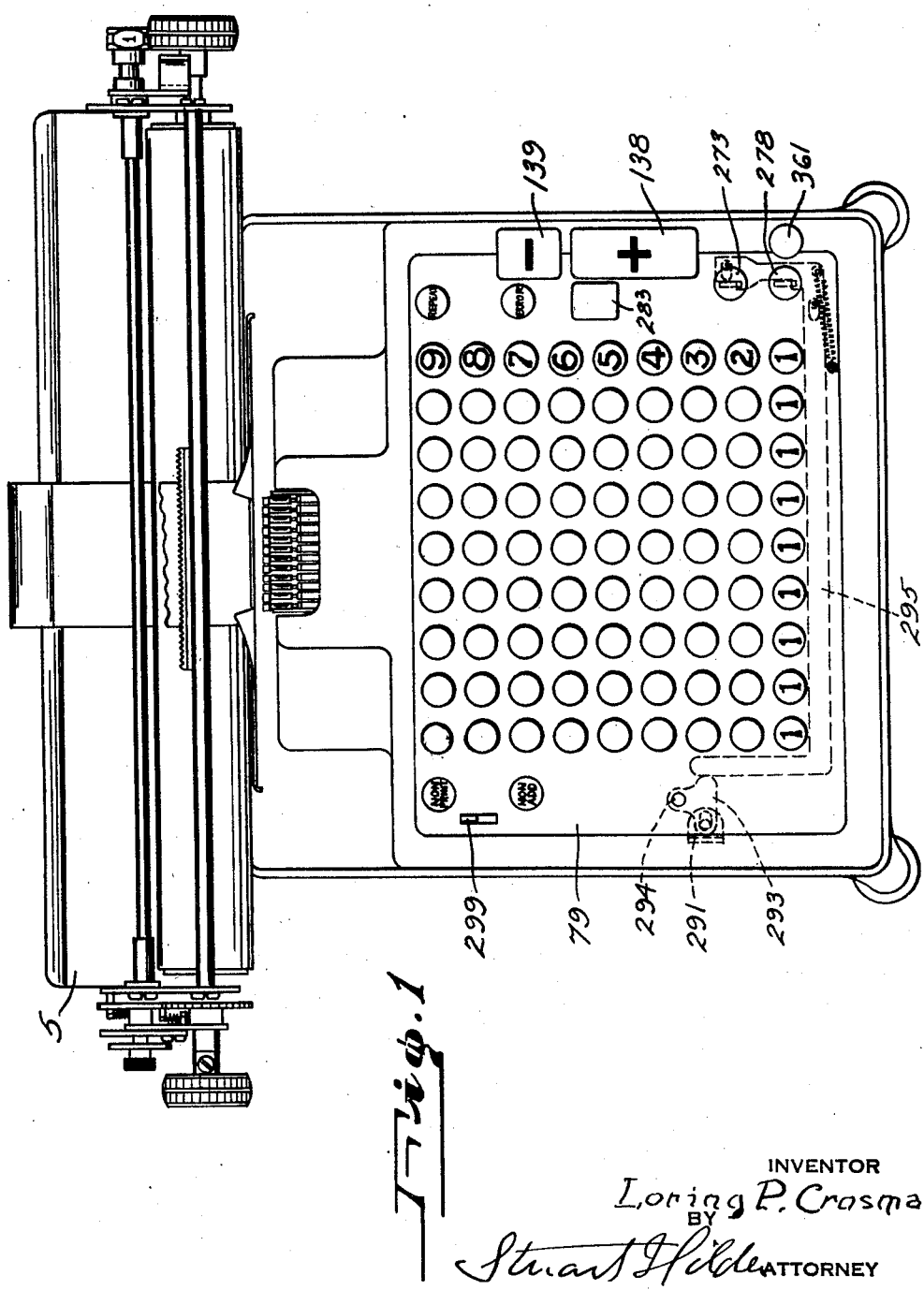
INVENTOR
Loring P. Crosman
BY
Stuart H. Selde ATTORNEY

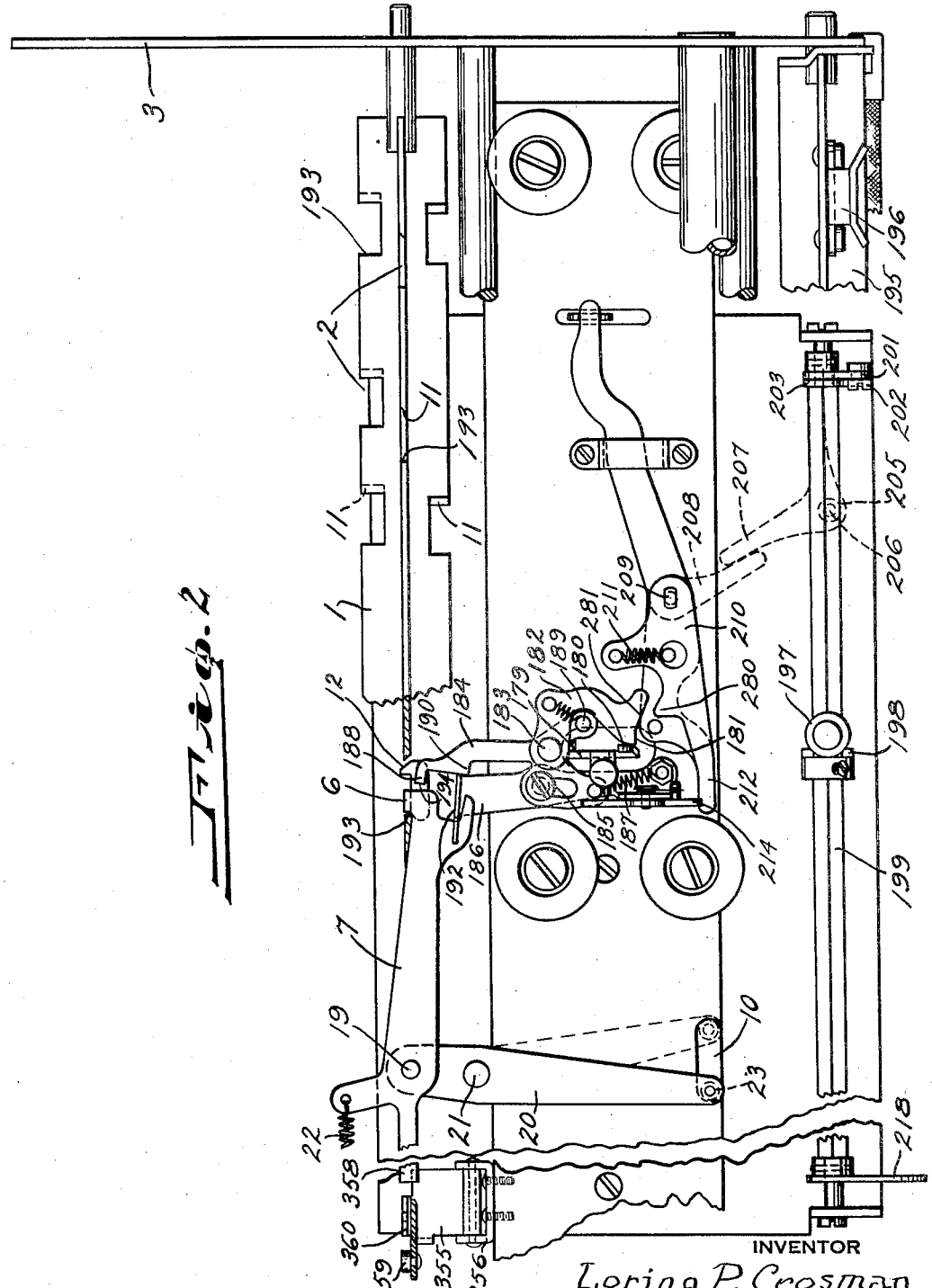

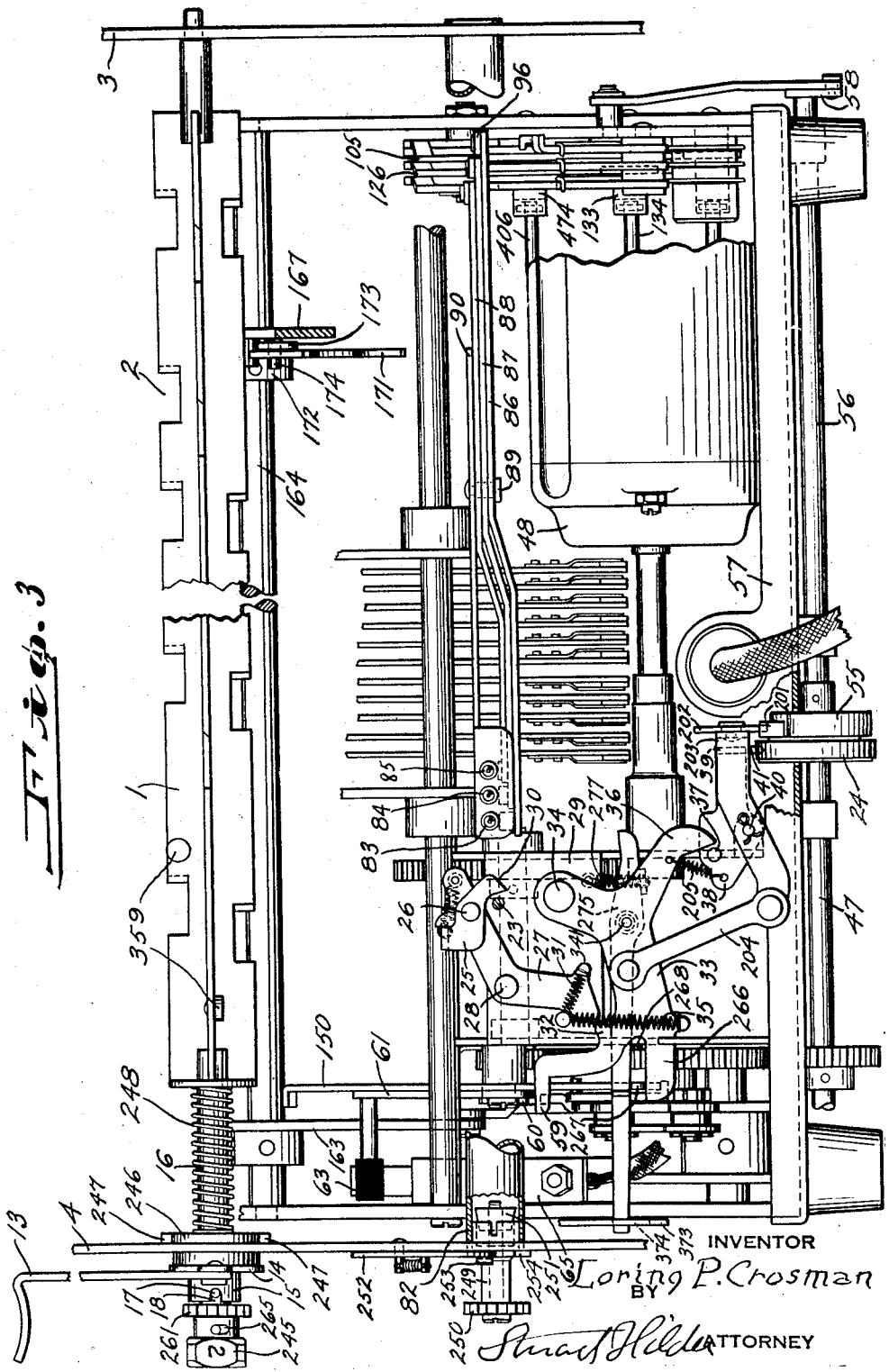

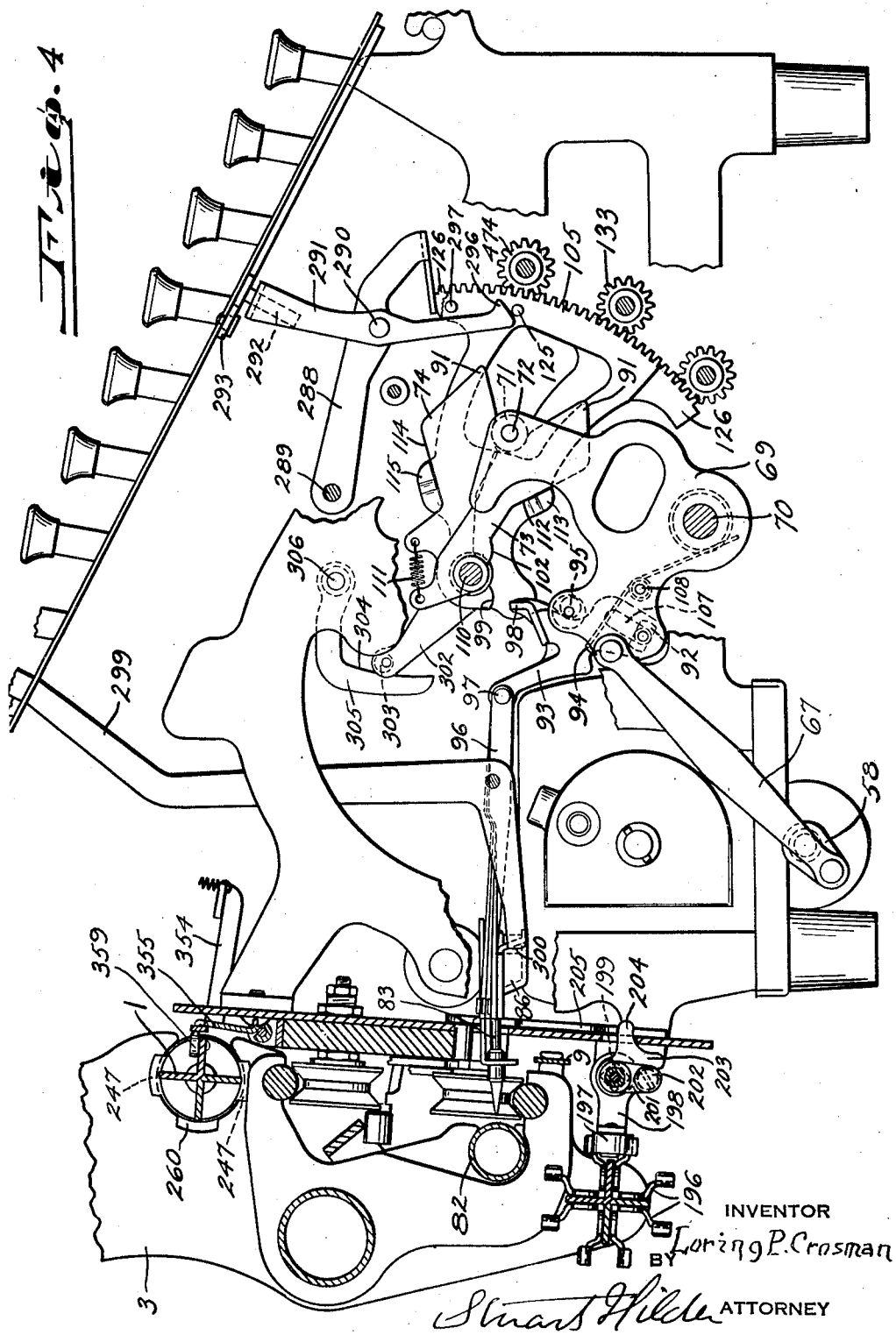

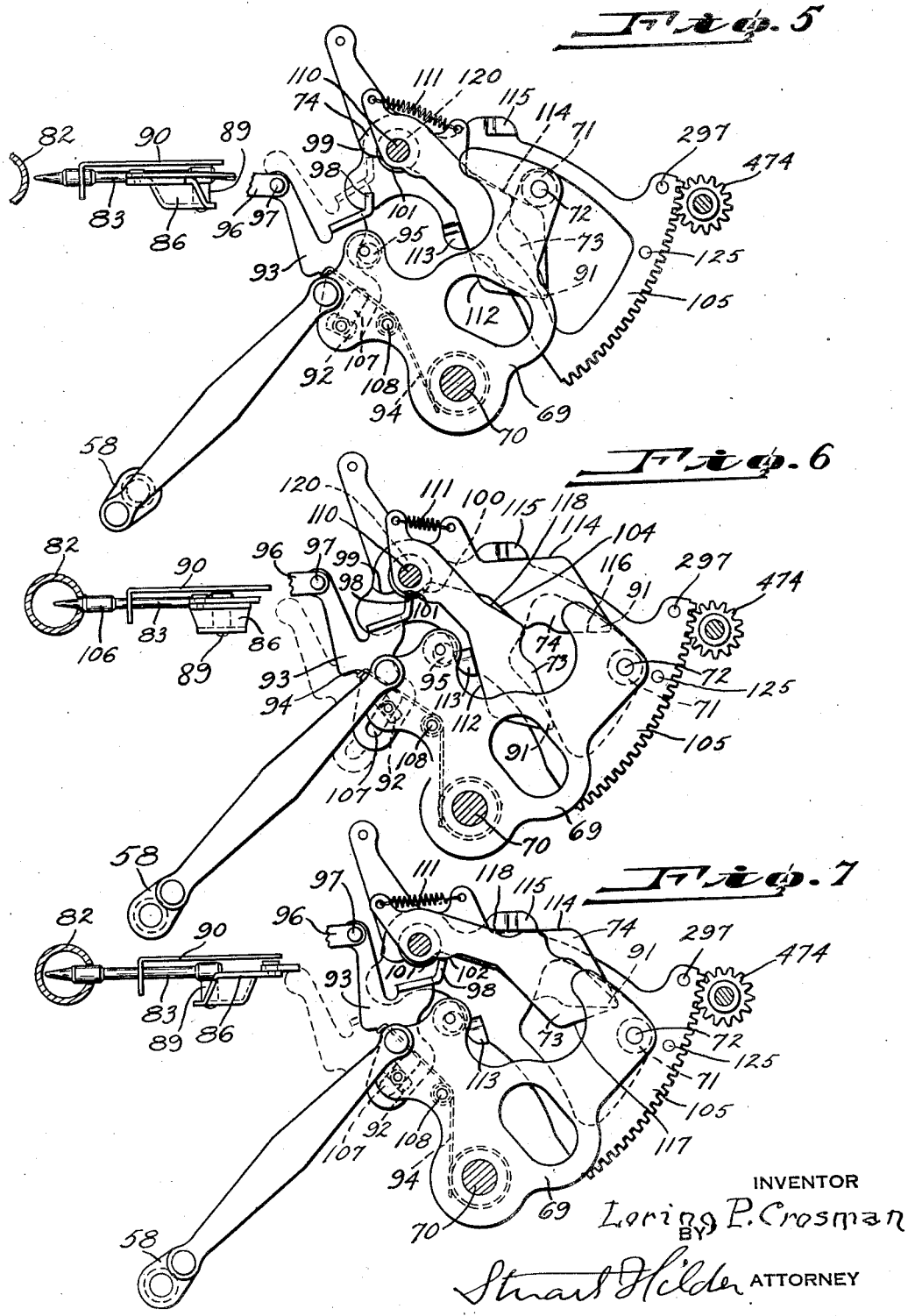

Feb. 13, 1934.  L. P. CROSMAN  1,946,572
LISTING CALCULATOR
Filed April 28, 1932   12 Sheets-Sheet 6
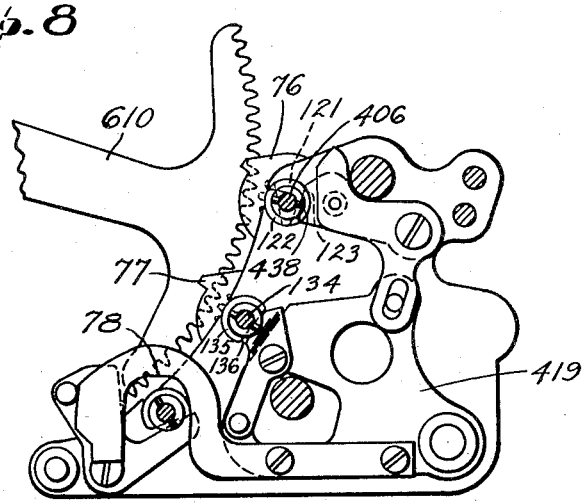
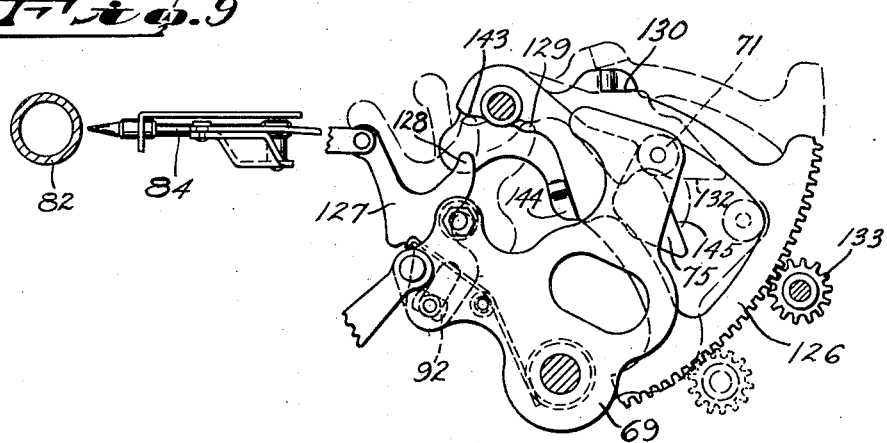
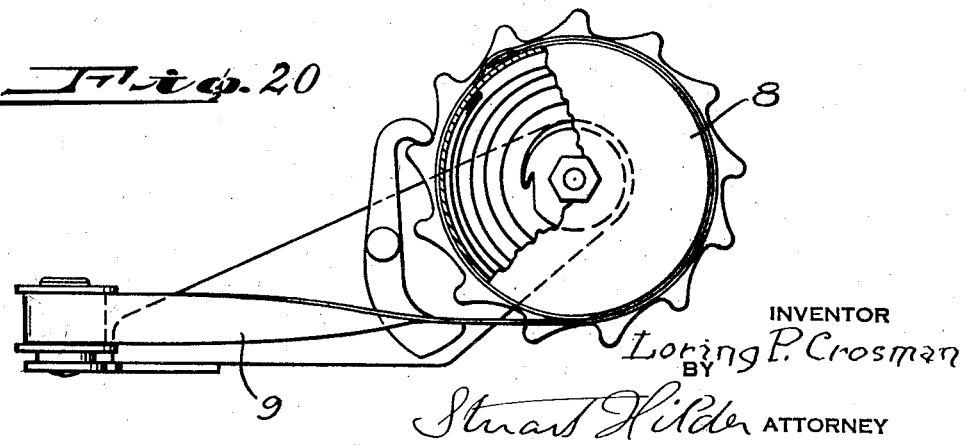
INVENTOR
Loring P. Crosman
BY
Stuart Hilder ATTORNEY

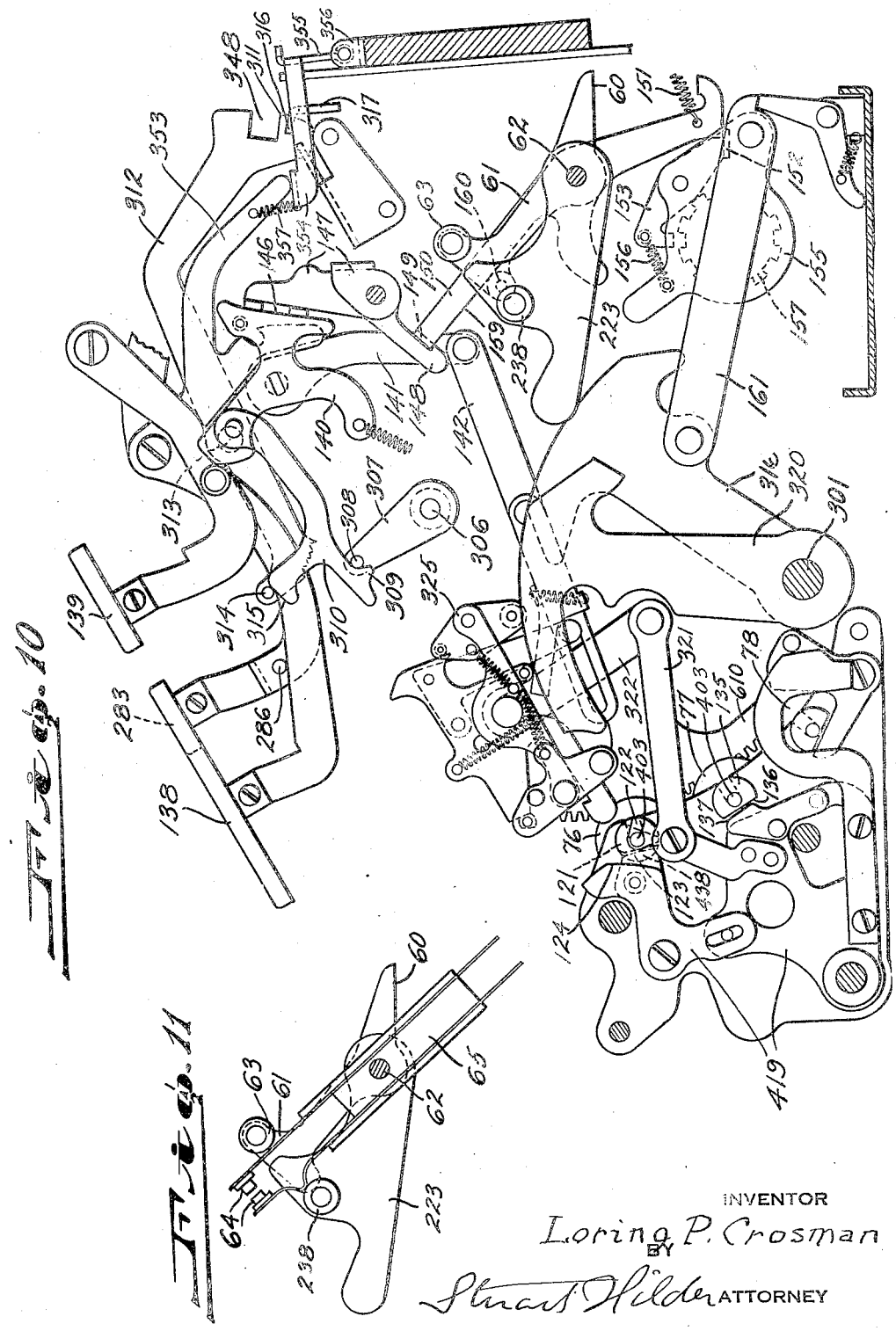

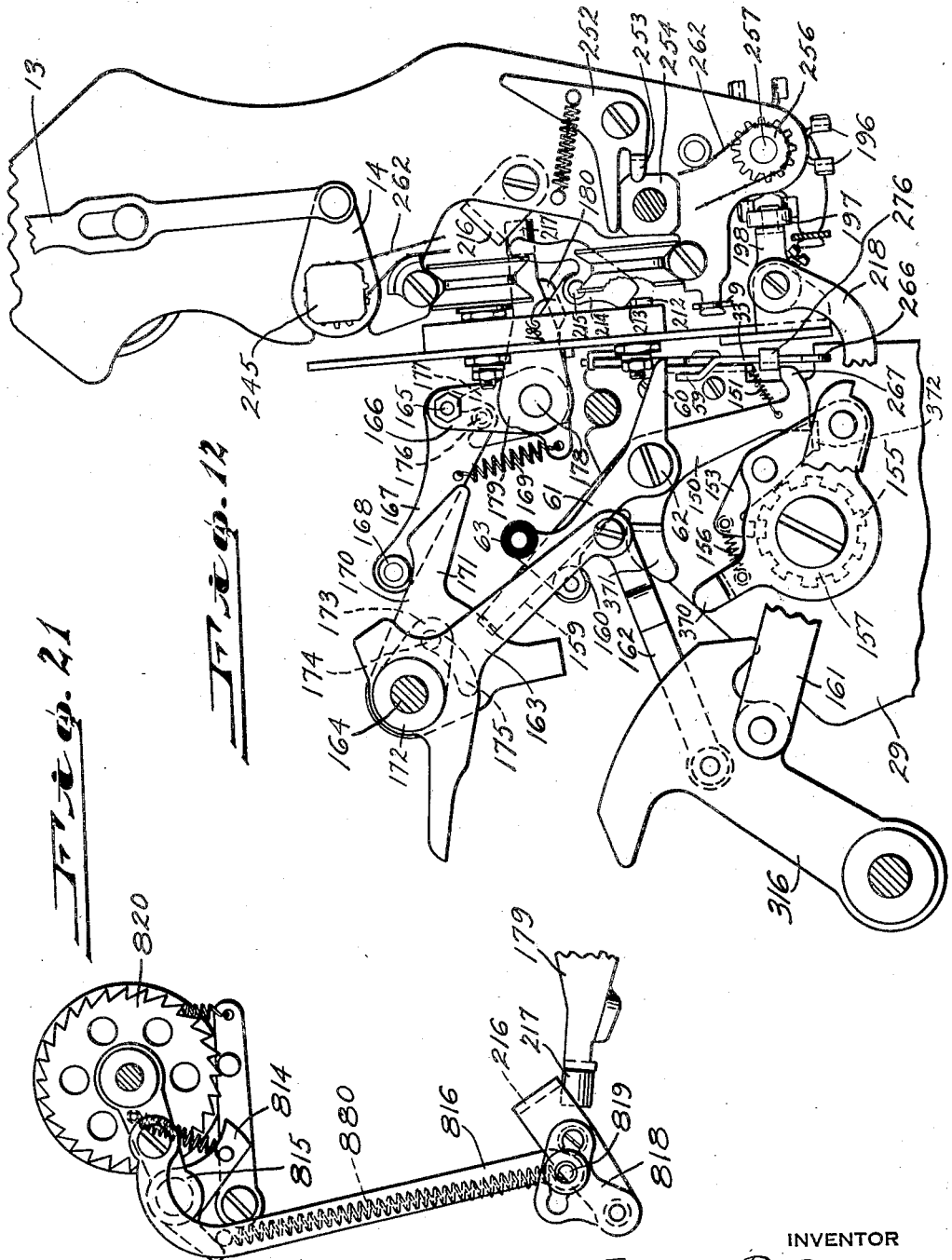

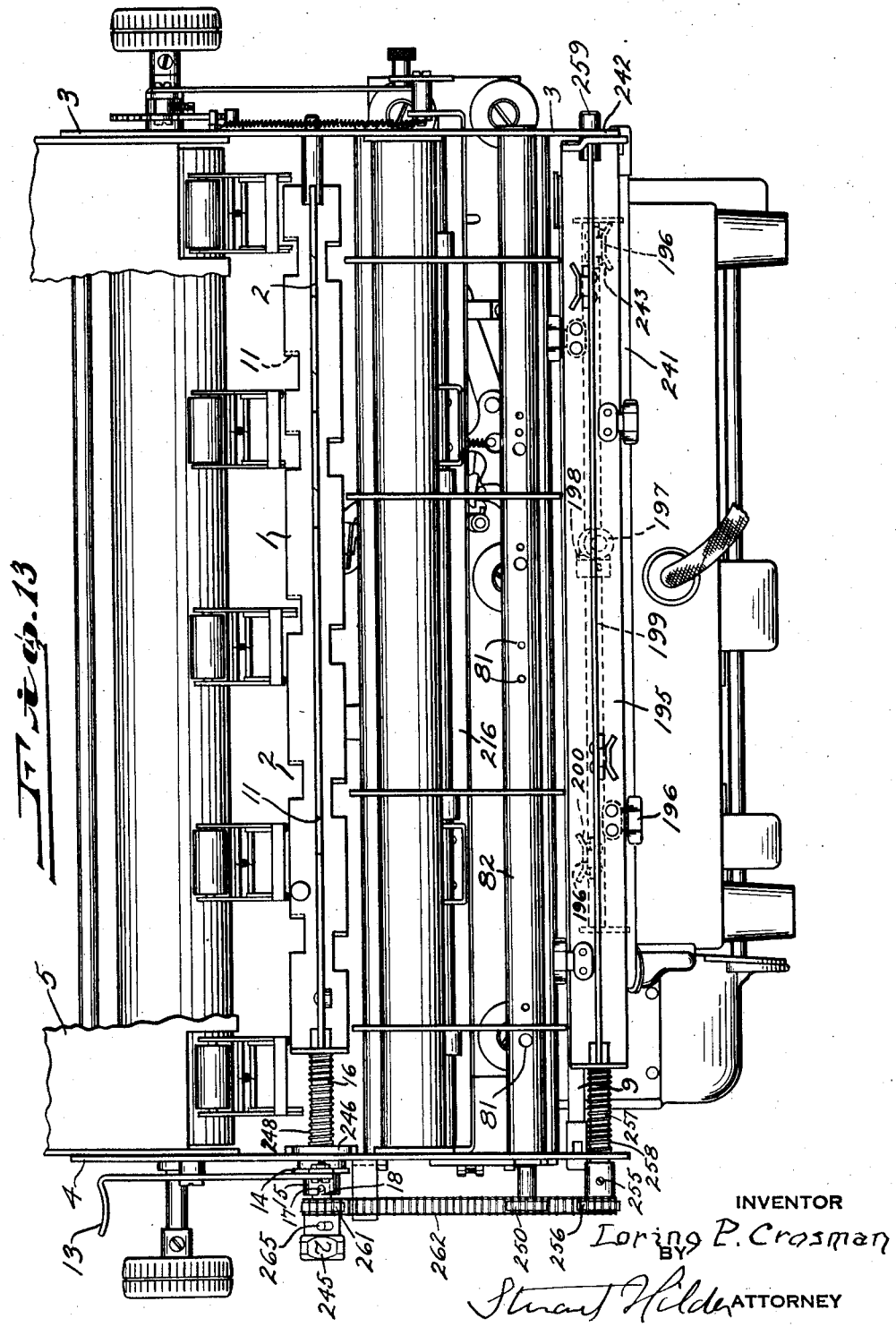

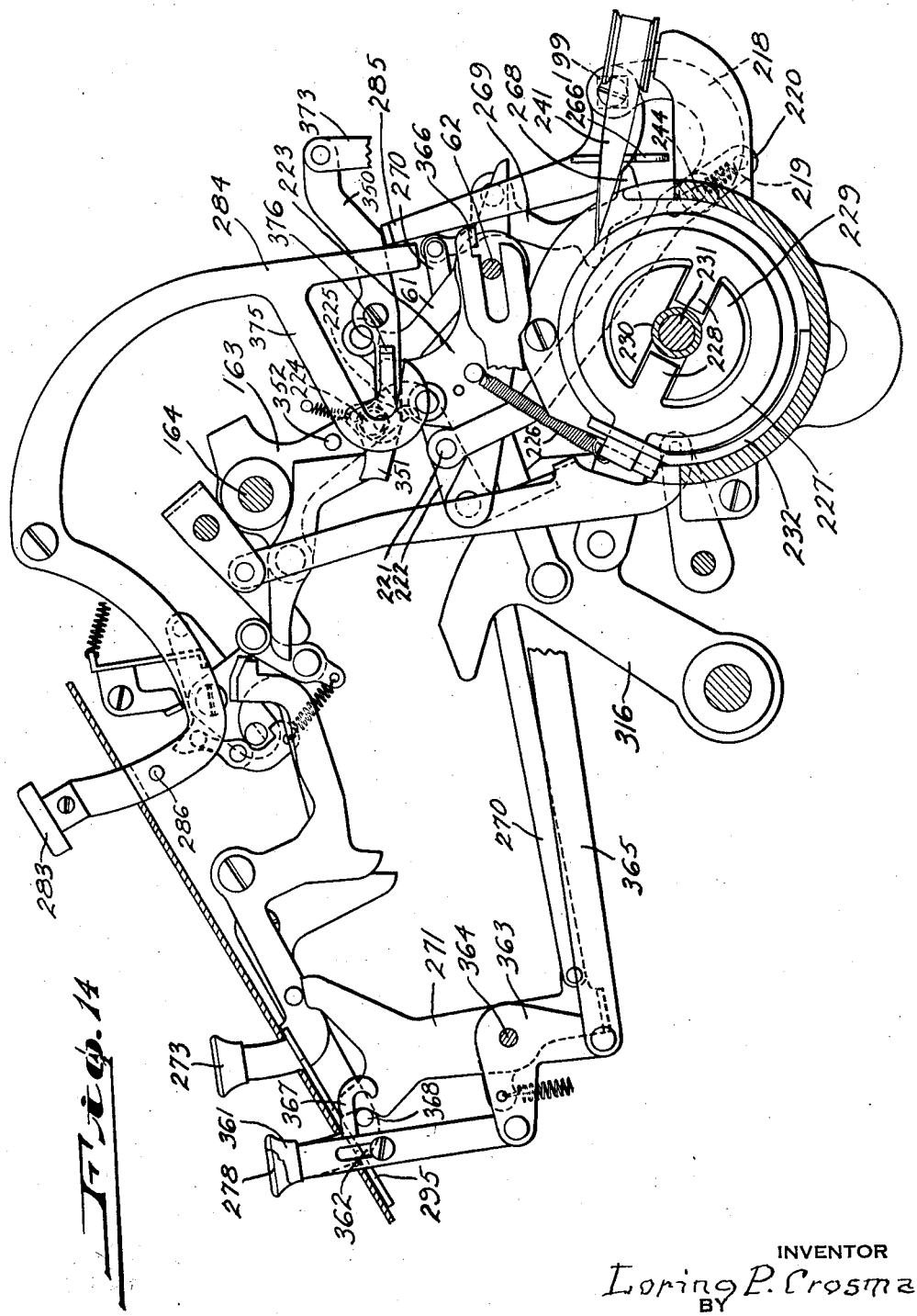

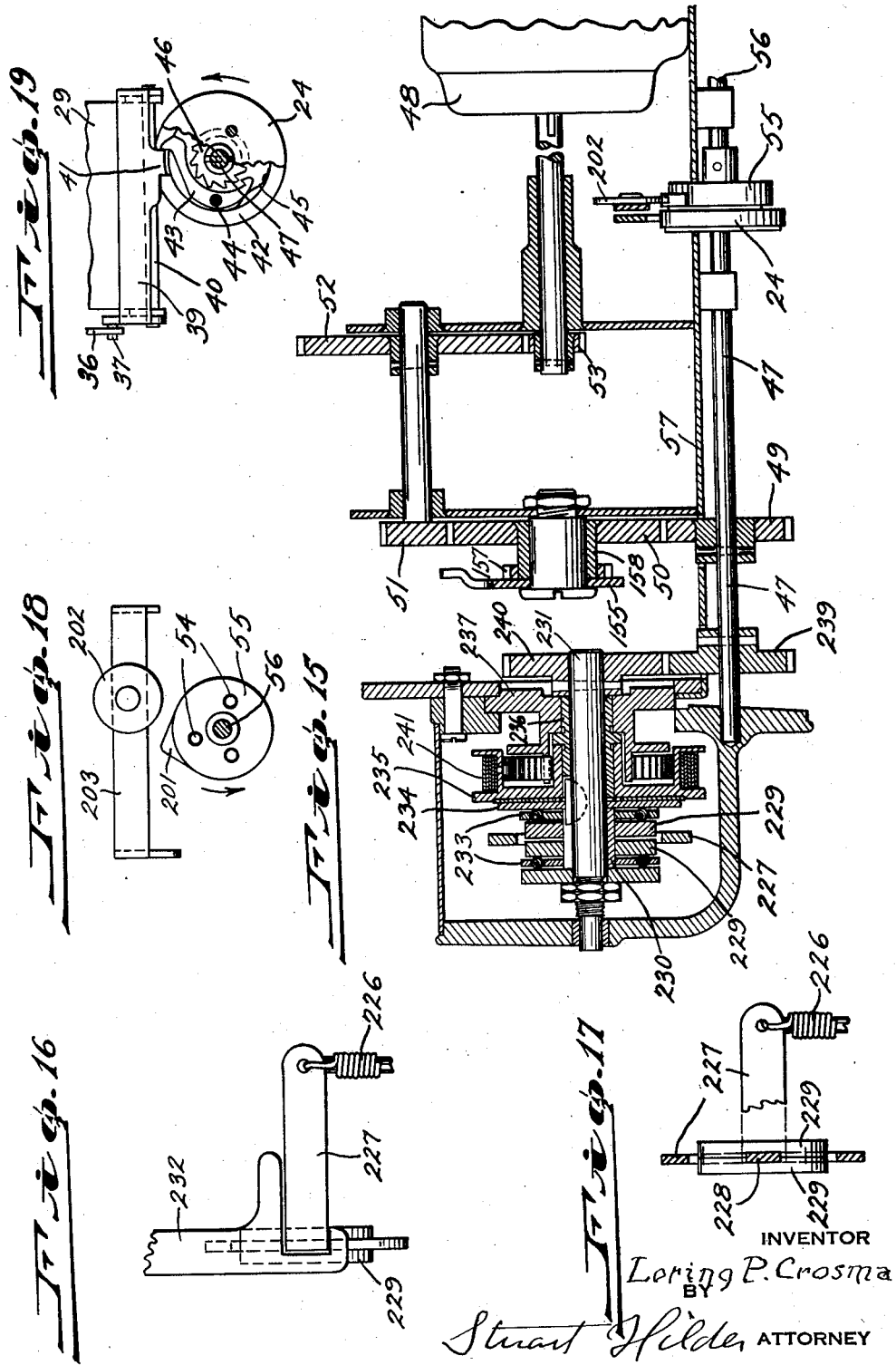

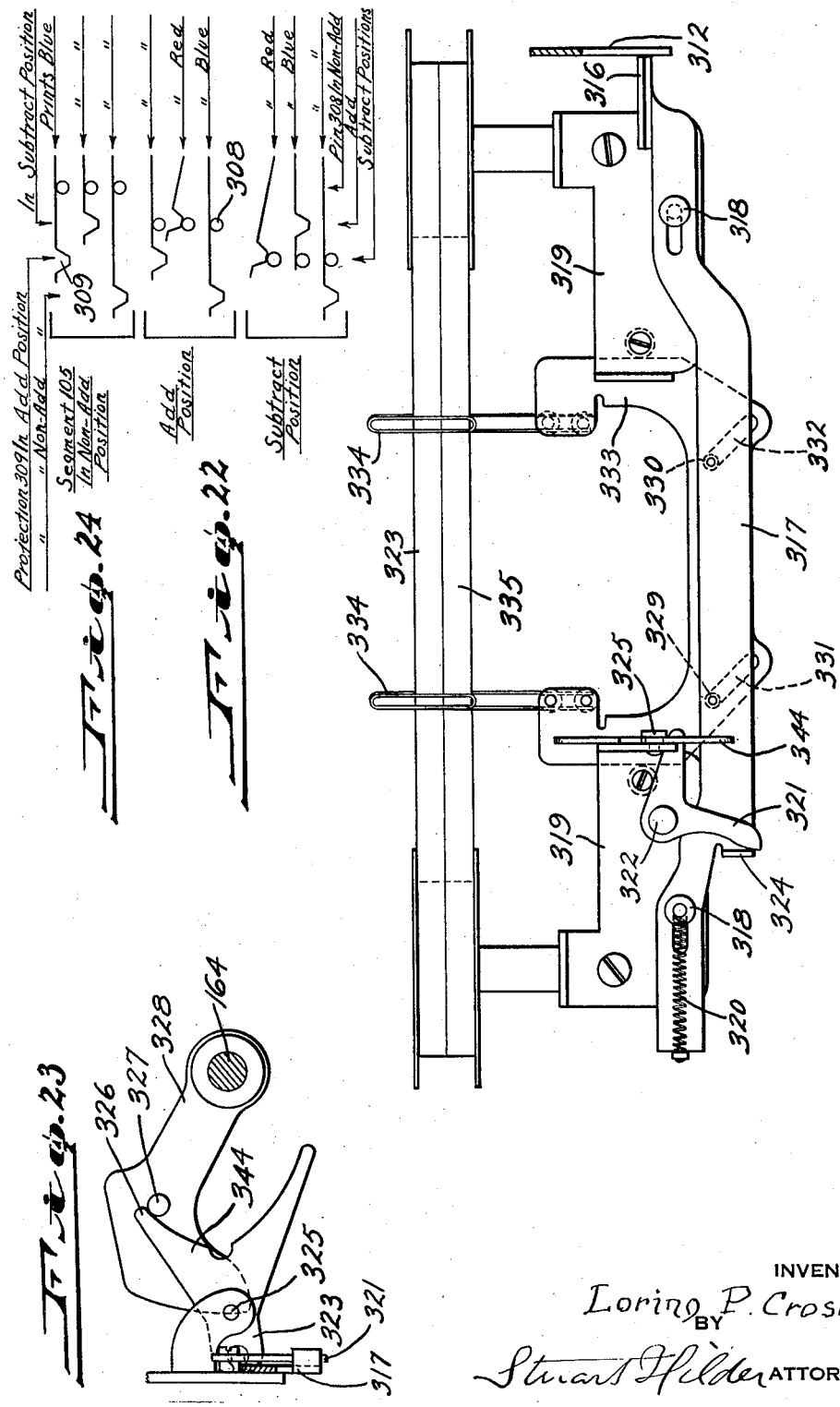

Patented Feb. 13, 1934

1,946,572

UNITED STATES PATENT OFFICE 1,946,572

LISTING CALCULATOR

Loring Pickering Crosman, Maplewood, N. J., assignor to Gardner Company, Orange, N. J., a corporation of Delaware Application April 28, 1932. Serial No. 607,982

11 Claims. (Cl. 235—60)

The invention has relation to listing calculators and more particularly to program mechanism whereby such a machine may be set automatically to perform a succession of different operations, in a given sequence.

The invention contemplates the provision of improved means for selecting the desired registers to be operated and/or for selecting the character of the operation to be performed thereon, in each of several columnar positions of a transversely shiftable carriage, and/or for shuttling said carriage back and forth between predetermined columnar positions, according to one or another of a plurality of complete programs.

The invention consists in the novel construction and combination of parts, as set forth in the appended claims.

In the embodiment of the invention illustrated herein, a listing calculator is shown constructed substantially in accordance with the disclosure of the U. S. patent to Clyde Gardner, No. 1,867,002, issued July 12, 1932, as modified by the disclosures of the applications of Loring P. Crosman, No. 518,061, filed February 25, 1931, and No. 558,665 filed August 22, 1931.

For convenience the invention is shown as applied to a machine having three registers. It is not however so limited since similar control means may be provided for additional registers.

In the accompanying drawings:

Fig. 1 is a diagrammatic plan view of a machine embodying the invention.

Fig. 2 is a detail rear elevation of the carriage releasing means.

Fig. 3 is a fragmentary rear elevation of the machine, with the carriage removed and showing certain parts controlling the register selecting clutch member.

Fig. 4 is a left hand elevation with the casing removed and the side frame broken away, showing the register selecting mechanism.

Figs. 5, 6 and 7 are detail left hand elevations showing different positions assumed by the number one register selecting mechanism.

Fig. 8 is a detail left hand elevation of certain cams for engaging the registers with the machine operating means.

Fig. 9 illustrates the different positions assumed by the number two and three register selecting mechanism.

Fig. 10 is a right hand elevation of parts controlled by the plus and minus operating bars.

Fig. 11 is a detail view of certain parts used for closing the motor circuit.

Fig. 12 is a right hand elevation of certain parts effecting the carriage release.

Fig. 13 is a rear elevation of the machine.

Fig. 14 is a right hand elevation of certain parts controlling the carriage return clutch, also showing the total and sub-total key locking means.

Fig. 15 is a cross-sectional rear elevation of the carriage return clutch and driving means therefor.

Figs. 16 and 17 are detail views of certain parts of the carriage return clutch.

Figs. 18 and 19 are detail views of certain parts of the register selecting clutches.

Fig. 20 is a detail view of means for advancing the carriage.

Fig. 21 is a detail view of line spacing mechanism.

Fig. 22 is a detail view of mechanism for shifting the type ribbon to print values in blue or red ink.

Fig. 23 is a detail view of operating means therefor.

Fig. 24 is a diagrammatic view illustrating the position of certain members controlling displacement of the type ribbon for printing values in blue or red.

The listing register to which the invention is shown as applied is of well-known type. It will be sufficient to say that, in operation, amounts set up on the digit keyboard are accumulated in one or more registers, either additively, by engagement of a register during the upward stroke, or subtractively, by engagement thereof during the downward stroke of reciprocatory actuating segments. The extent of movement of each segment is determined by the value of the corresponding set digit key, and type bars, connected with the segments, are designed to bring type of corresponding values to the printing line. The record sheet and platen are supported in a transversely shiftable carriage, so that the accumulated values may be printed in any one of several columns, and the accumulating, printing and carriage shifting operations are performed by power means under control of suitable motor keys.

*Means for setting and securing the carriage in columnar position (Figs. 2, 4 and 13)*

A tabulating program bar 1, comprising two right angled members welded together at their apex, is rotatably supported in the frames 3 and 4 of a transversely shiftable carriage 5. In each of the four blades of program bar 1 are a series of notches 2, spaced in accordance with the columnar positions of a given form sheet, and adapted by engagement with a projection 6 of a lever 7 to secure the carriage against lateral movement under the influence of a spring drum 8 (Fig. 20).

Spring drum 8 is mounted upon the left hand casing of the machine and has suitably secured thereto one end of a tape 9, the other end of which is secured to the right hand frame 4 of the carriage, as shown in Figs. 4, 12 and 13. Upon disengagement of a notch 2 from the projection 6 of lever 7, as hereinafter described, drum 8 will act to move the carriage toward the right, as viewed in Fig. 13.

Lever 7 (Fig. 2) is fulcrumed at 19 upon a lever 20 fulcrumed at 21 upon the rear casing of the machine and provided with a stud 23 adapted to contact with said casing through a suitable aperture 10, thus limiting the movement of lever 20.

In starting a series of operations the carriage is just set by hand to bring the left hand column into printing position, cam surfaces 11 of notches 2 contacting surface 12 of lever 7 to rock said lever downwardly, disengaging its projection 6 from the related blade of bar 1.

A thumb bar 13 (Figs. 3 and 12) is also provided, to disengage the bar 1 from projection 6, when shifting the carriage by hand in the opposite direction. The lower end of thumb bar 13 is pivotally connected to an arm 14 provided with a hub 15 loosely mounted upon the journal 16 of bar 1. A pin 17 in journal 16 normally engages an aperture 18 of the hub 15.

Downward pressure upon thumb bar 13 will therefore rock lever 14 and, through hub 15 and pin 18, rock the shaft 16 to lift the forward blade of the program bar 1 upwardly free of the projection 6 of lever 7.

Disengagement of the tabulating program bar 1 from projection 6 of lever 7 will cause said lever, under the influence of spring 22, to be moved toward the left, thus rocking the lever 20 to the position indicated by dotted lines, Fig. 2.

The carriage having been set to the desired columnar position, projection 6 of lever 7 will have re-engaged a corresponding notch 2 of tabulating bar 1 and under the influence exerted by spring drum 8, said bar will restore the levers 7 and 20 to their normal position.

During the excursion of the lever 20 the pin 23 is adapted to operate means for engaging the register selecting clutch member 24 (Figs. 3, 15 and 19) in the manner and for the purpose hereinafter described.

*Means for engaging the register selecting clutch and initiating motor drive to the register selecting mechanism*

As the lever 20 is moved to the position indicated by the dotted lines (Fig. 2) the stud 23 is carried to the right (as viewed in Fig. 3) of a trip pawl 25, pivotally mounted at 26 upon the upper arm of a latch 27, pivoted at 28 upon a bracket 29.

Upon its return movement, however, the stud 23 will contact the surface 30 of trip pawl 25 and rock the latch 27 against the tension of its spring 31, to free said latch from engagement with a projection 32 of a spring tensioned plate 33, pivotally mounted at 34 upon bracket 29.

The releasing of latch 27 from plate 33 will cause said plate, under influence of spring 35, to be rocked clockwise about point 34, and arm 36 of said plate will contact a pin 37, fast to one arm 38 of a cross-over bar 39 (Figs. 3 and 19), pivotally mounted upon a short shaft 40.

The cross-over bar 39 is provided with a projection 41 normally in engagement, through a suitable aperture cut in the casing 42 of the clutch 24, with a pawl 43 pivotally secured at 44 to the casing of said clutch.

Contact of arm 36 with pin 37 will raise the cross-over bar 39, and projection 41 will be lifted free of the casing 42 and will disengage from pawl 43, whereupon said pawl, under influence of a spring 45, will be rocked into engagement with a ratchet 46. Ratchet 46 is keyed to a drive shaft 47 having connection, through gears 49, 50, 51, 52 and 53, with the motor 48 as shown in Fig. 15.

The casing 42 of clutch 24 is secured by pins 54 (Fig. 18) to a cam 55, keyed to a shaft 56 having bearings in support plate 57 and having fast to the end thereof a crank arm 58, as shown in Figs. 3 and 4.

During the previously described movement of plate 33 an arm 59 of said plate will engage projection 60 of a lever 61 (Figs. 3, 11 and 12), rocking said lever about its fulcrum 62, to cause an insulated roller 63 fast thereto to close the contact points 64 of a switch 65 interposed in the circuit of the electric motor 48.

Upon contacting of points 64 motor 48, through clutch 24 and the above described gear train, will drive crank arm 58 in a counter-clockwise direction (as viewed in Fig. 4). The following means are provided to limit the movement of said crank arm to one complete revolution:

Near the end of the revolution of crank arm 58 a projection 201$^a$ of cam 55 will contact roller 202$^a$, fast to a member 203$^a$ loosely mounted upon shaft 40, rocking said member counter-clockwise, as viewed in Fig. 3.

Member 203$^a$ has link connection 204$^a$ with the plate 33 and as said member 203$^a$ is rocked the link 204$^a$ will restore plate 33 to its normal latched position and end 36 will release pin 37, to allow projection 41 of arm 39, under influence of spring 205$^a$, to rest upon the periphery of the casing 42 of clutch member 24.

At the extreme end of a revolution of shaft 56 projection 41 will disengage pawl 43 from ratchet 46 and re-engage with casing 42 of clutch 24, to secure shaft 56 and crank arm 58 in full-cycle position.

Crank arm 58 has link connection 67 with a rock arm 69 pivotally mounted at 70 upon the right hand framing of the machine and provided with a roller 71 adapted to engage cam members 73, 74 and 75 (Figs. 4 and 9), in the manner and for the purpose hereinafter described.

*Means for selecting registers and the character of registration (Figs. 3, 4, 5, 6, 7 and 13)*

The machine illustrated in the accompanying drawings is provided with three registers 76, 77 and 78 constructed, and adapted to be operated in accordance with the disclosure of U. S. Patent No. 1,867,002 wherein values set upon a keyboard 79 (Fig. 1) are transmitted to said registers by means of segmental rack levers 610.

As the carriage is set to the desired columnar position, as previously described, one group of a series of orifices 81 of a tubular bar 82 (Fig. 13), suitably supported in the framing of the carriage, will be positioned opposite corresponding plungers 83, 84 and 85 (Fig. 3). Said plungers are loosely mounted upon whiffletree levers 86, 87 and 88, pivotally secured at the common fulcrum point 89 to a bracket 90, supported within the framing of the machine and acting as a guide support for the free ends of plungers 83, 84 and 85.

The bar 82 is adapted to limit rearward movement of the plungers 83, 84 and 85 (Fig. 4) to set cams 73, 74 and 75 to co-operate with roller 71 of rock arm 69 as hereinafter described.

*Parts controlling the number one or cross-footer register 76 (Figs. 4, 5, 6, 7, 8 and 10)*

Mounted by slot engagement 107 upon a stud 92 of rock arm 69 is a cam positioning lever 93, normally positioned against stud 92 and eccentric stud 95 of rock arm 69 by means of a spring 94, also mounted upon rock arm 69 at 108.

A link 96 pivotally connected at 97 to the positioning lever 93 is loosely connected at its rearward end to the whiffletree lever 86 upon which is mounted the plunger 83.

As the rock arm 69 is moved by crank arm 58 from the position illustrated in Fig. 4 to the position illustrated in Fig. 6 the cam positioning lever 93, under influence of spring 94, will rock with said lever and through link 96 will rock the lever 86 counter-clockwise about its fulcrum point 89 (Fig. 3) the movement of lever 86 being limited to any one of three positions in the following manner:

If, as shown in Fig. 5, there is no hole opposite the plunger 83 said plunger will move but slightly before contacting the bar 82. The plunger 83 being thus held from further movement the connecting link 96 will also be held and, as rock lever 69 completes its forward movement, will act as a pivot point for the positioning lever 93, said lever, under influence of spring 94, being raised and rocked about point 97 until stopped by means of the projection 98 contacting the surface 99 of the cam 74 (Figs. 4 and 5).

As shown in Fig. 6, a small diameter hole opposite the plunger 83 will allow said plunger to move until stopped by the larger diameter portion 106 contacting the bar 82, whereupon the pivot point 97 will be positioned as shown in Fig. 6, and subsequent movement of rock lever 69 will cause the stud 92 to release the lower end of positioning lever 93 and said lever under influence of spring 94, will be raised and rocked about point 97 until stopped by engagement of projection 98 with a suitable collar 120 on stud 110, opposite the surface 100 of the cam 74 and surface 101 of the cam 73.

A large diameter hole opposite the plunger 83 will allow said plunger to move its full distance, to position the pivot point 97 still further forward, as shown in Fig. 7, whereupon the projection 98 will be adapted to contact surface 102 of the cam 73.

In order to counteract slight inaccuracies of alignment, the plungers, 83, 84, 85, are made with shanks of reduced diameter and with tapered ends, so that, as the point of the plunger enters the hole of bar 82, the reduced portion of said plunger will register with the guide opening of bracket 90, allowing a degree of lateral movement of the plunger as it is seated in the bar 82.

The above-described movement of the positioning lever 93 is adapted to position the cams 73 and 74 to either side of the path of movement of the roller 71 to bring certain surfaces, of said cams into active relation with said roller, for the purpose of rocking the gear segment 105, to set register 76 into non-operative, add or subtract positions, as hereinafter described.

Cams 73 and 74 are pivotally mounted upon a stud 110, fast to the frame of the machine, cam 73 being normally tensioned for downward movement bp the spring 111, and cam 74 tensioned for upward movement by said spring.

With the register 76 standing at non-operative position and the parts at normal, cams 73 and 74 and gear segment 105 will be positioned as shown in Fig. 5, that is, the surface 112 of cam 73 will be held by spring 111 against a projection 113 of segment 105, the surface 114 of cam 74 will be held against the roller 71, and gear segment 105 will be in its lower position.

*Means for engaging the register for addition*

If the values to be printed in a given column are to be added upon register 76, the tubular bar 82 will have a small diameter hole opposite the plunger 83 whereupon, as previously described, the rocking of lever 69 will cause said plunger to position the pivot point 97 as shown in Fig. 6 and the projection 98 of positioning lever 93 will be brought against the collar 120 opposite the surface 100 of cam 74 and 101 of cam 73, therefore exerting no influence upon said members.

Thus as roller 71 is carried forwardly from the position illustrated in Fig. 5, spring 111 will rock cam 74 upwardly until surface 114 of said cam contacts a projection 115 of segment 105.

During return movement of arm 69 roller 71 will contact the surface 116 of cam 74 and rock said cam so that surface 114, acting against projection 115, will rock the segment 105 upwardly sufficiently to rotate the register control gear 474 in engagement therewith through approximately 90° of clockwise movement.

A rod 406 (Figs. 3 and 8) has universal joint connection with the register control gear 474 and with the floating register shaft 403 (Fig. 10). there being a collar cam 438 secured to each end of said shaft and provided with flattened portions 121 and 122.

The above-described movement of the register control gear 474 is adapted to rock the collar cams 438 and cause the portions 121 thereof to contact the surfaces 123 of a cam plate 419 and thus rock register 76 into engagement with the teeth of racks 610.

The cam plate 419 has connection through link 321 with an arm 322 of a rocker device 325, provided with two cam followers adjustable by keyset control devices to different positions relative to cam arms 316 and 320, respectively of rock shaft 301.

Normally these control devices are set (as in Fig. 10) to provide for additive registration, wherein the surface 123 of plate 419 is rocked free of the collar cams 438 to disengage the register during the first part of an operative cycle of the machine, before the reciprocatory racks 610 are allowed to move, the plate being moved to reengage the register while the racks lie in their extreme operated position, as fully described in the aforementioned patents.

Upon return movement of the racks the value set in the keyboard will be additively transferred to the register.

*Means for engaging the register for subtraction*

If the register 76 is to perform a subtractive operation a larger diameter hole in bar 82 will have been positioned opposite the plunger 83, to displace pivot point 97 of positioning lever 93 to the position shown in Fig. 7, the projection 98 of said lever contacting the surface 102 of cam 73.

Upon the forward movement of roller 71, the projection 98 of the positioning lever 93, under influence of hair spring 94, will rock cam 73 upwardly, against tension of spring 111, to bring the surface 117 of said cam into active relation with roller 71. Cam 74 having been moved (or held) in raised position by the spring 111, the lower surfaces of both cams will lie in the path of movement of roller 71, as shown in Fig. 7.

Return movement of rock arm 69 will now cause roller 71 to engage the surface 117 of cam 73, and surface 118, acting against projection 115, will move segment 105 its full movement to impart an approximate 180° clockwise movement to the register control gear 474.

The above-described movement of gear 474 is imparted to the collar cams 438 and will rotate said cams sufficiently to carry the portions 121 past the surfaces 123 of the cam plate 419, the register thus remaining out of engagement with racks 610. However, the portions 122 of the collar cams will now be positioned opposite the surfaces 124 of the cam plate 419 and as said plate is caused to be rocked (through control means 325 and cam 320) the surface 124 of plate 419 will act against the portions 122 of the collar cams to engage the register members with racks 610 before said racks are allowed to move. Upon the initial movement of racks 610 values set up on the keyboard will be negatively transferred to the registers, control means 325 acting while the racks lie in their extreme operated position to disengage the registers and allow said racks to return idly to their normal position.

*Means for holding the register in non-operative position*

If in a given columnar position of the carriage no operation is to be performed upon register 76, bar 82 will have no recess opposite the plunger 83 (Fig. 5) and said plunger, during subsequent movement of the rock arm 69, will position projection 98 of lever 93 into engagement with the surface 99 of cam 74, as previously described.

Upon forward movement of roller 71 the projection 98 of positioning lever 93, under influence of spring 94 will rock the cam 74 downwardly, against tension of spring 111, to engage the surface 104 (Fig. 6) of said cam with the projection 113 of segment 105 and, cam 73 being rocked or held downwardly, against projection 113, by spring 111, the point 91 of both cams will be positioned below the path of movement of roller 71.

As rock arm 69 is returned to its normal position the roller 71 will now contact the upper surface of cam 74 and rock said cam and gear segment 105 downwardly whereupon register control gear 474 will rotate the collar cams 438 to the non-operative position (as shown in Figs. 8 and 10) wherein the portions 122 are free of the surfaces 124 of plates 419 and the flat sides of portions 121 are opposite the surfaces 123 of said plates, the register being in disengaged position.

During the rocking movement of the plate 419, incident to an operative cycle of the machine, the surfaces 123 and 124 of said plate will remain inactive relative to the collar cams 438 and the register will remain out of engagement with the racks 610 during their full operative movement.

*Control of the second and third registers*

In the machine illustrated in the accompanying drawings number two and number three registers 77 and 78 are shown, wherein the character of operation is determined by plus and minus bar operation. However, control means as described for the number one register may be provided, in which case the plus bar would become an operating key and the minus bar would be used merely as a correction key, as is quite apparent from the foregoing description.

The character of operation of registers 77 and 78 being controlled by the plus or minus bar, the columnar position of the carriage merely provides for engagement of the desired register with racks 610 and only a single cam member 75 (Fig. 9) will be required for each register, adapted to rock a corresponding gear segment 126 to either of two alternative positions to engage or disengage the related register, in the following manner:

Since the means for controlling the number two register 77 and the number three register 78 are of like construction and act similarly, only the action for register 77 is described herein, it being understood said action applies also to register 78.

Mounted upon the stud 92 of rock lever 69 (as shown in Fig. 9) is a positioning cam 127, adapted upon forward movement of rock lever 69 to be moved to either of two positions, as indicated by the full and dotted lines, according to the displacement of the related plunger 84, said plunger being adapted to contact the bar 82 to position the lever 127 in the manner previously described for the number one register 76.

If in the columnar position of the carriage a hole appears opposite the plunger 84 said plunger will cause the projection 128 of lever 127, upon forward movement of rock arm 69, to be brought into engagement with the surface 129 of cam 75 and rock said cam upwardly, against the projection 130 of gear segment 126. Upon return movement roller 71 will contact the surface 132 of said cam, to rock the segment 126 upwardly to the position indicated by dotted lines.

The gear segment 126 has engagement with register control gear 133, connected by rod 134 (Figs. 3, 8 and 10) to a collar cam 135, fast to the shaft 403 of register 77, and normally positioned with a flattened surface 136 opposite the surface 137 of cam plate 419.

The above-described movement of segment 126 will rock the collar cam 135 to cause the surface 136 of said cam, acting against surface 137 of plate 419, to rock the register 77 into engagement with the teeth of racks 610.

Subsequent operation of the plus or minus bars 138, 139 through levers 140, 141 and link 142 will set the control devices 325 to provide for maintaining the engagement of the register 77 during the forward or return stroke of racks 610, for the purpose of adding or subtracting the value set up in the keyboard as previously described.

If there is no hole in bar 82, opposite the plunger 84, the projection 128 of lever 127 will contact the surface 143 of cam 75 and rock said cam downwardly against the projection 144 of segment 126 and roller 71 will contact the surface 145 of said cam to rock the segment 126 to its lower position, the collar cam 135 thus being turned to bring the flat surface 136 opposite cam plate 419 and register 77 (under influence of spring members not shown) will be moved out of engagement with the racks 610.

Means for shifting the carriage to successive columnar positions

As shown in Fig. 10 a lever 147 is provided with a hook end 148 having engagement with projection 149 of a lever 150, pivotally secured at 62 to the bracket 29, as shown in Fig. 12.

As fully described in the aforementioned application 518,061 operation of the plus, minus, non-add, total or sub-total key will rock lever 147 to disengage hook end 148 from lever 150.

Disengagement of hook 148 from lever 150 will cause said lever, under influence of spring 151, to be rocked out of engagement with the projection 152 of a pawl 153, pivotally mounted upon the crank arm 155, and cause said pawl under influence of its spring 156 to be rocked into engagement with a notched disc 157, fast to the hub 158 of gear 50 (Fig. 15) having drive connections with motor 48 as previously described.

During the above-described movement of lever 150 the surface 159 of said lever will contact a stud 160, fast to the lever 61, and rock said lever downwardly to cause the insulated roller 63 (Fig. 11) fast thereto to contact the points 64 of the motor switch 65 and initiate an operating cycle of the machine.

During an operating cycle of the machine crank arm 155, having link connections 161 with the cam 316, fast to shaft 301, will impart reciprocating movement to said cam.

The reciprocating movement of cam 316 is adapted, through link 162 (Fig. 12), arm 163 and shaft 164, to operate the carriage releasing means shown in Fig. 2, in the following manner.

Pivotally mounted at 165 upon a bracket 166, suitably secured to the rear casing of the machine, is a bell crank lever 167 (Figs. 3 and 12) provided with a roller 168, held by tension of spring 169 against surface 170 of an arm 171, loosely secured to a shouldered hub 172 of an arm 173 fast to the shaft 164.

Arm 173 is provided with a pin 174 having engagement with a slotted opening 175 of arm 171. During the forward movement of cam 316 said pin is carried downwardly and arm 171 is allowed to fall away from roller 168 to allow lever 167 to be rocked downwardly by spring 169.

A pin 176 fast to lever 167 has engagement with a lever 177 fast to a short shaft 178 mounted in bracket 166, which pin during said movement of lever 167 will rock lever 177 and shaft 178 in a clockwise direction as viewed in Fig. 12.

Secured to the shaft 178 is an arm 179 provided at its free end with a projection 180, adapted during movement of shaft 178 to be moved downwardly into latching engagement with the surface 181 of a spring tensioned latch pawl 182 (Fig. 2).

Upon return movement of cam 316, link 162 and arm 163 will rock shaft 164 counter-clockwise, as viewed in Fig. 12, and pin 174 of arm 173 will lift the lever 171 upwardly to cause the surface 170 of said lever, contacting roller 168, to rock the lever 167 clockwise about point 165, and pin 176 through lever 177 will rock shaft 178 counter-clockwise, to move the projection 180 of lever 179 upwardly whereupon, said projection being in engagement with the surface 181 of latch pawl 182, will lift said pawl bodily.

Pawl 182 is pivotally mounted at 183 upon a trigger 184, secured by pin and slot engagement 185 to a bracket 186 fast to the rear frame of the machine.

As pawl 182 is moved upwardly trigger 184 will be carried upwardly therewith and spring 187 will rock said trigger to position its projection 188 above the projection 6 of lever 7. This rocking movement of trigger 184 will cause a stud 189 fast to said trigger to disengage the pawl 182 from projection 180 of lever 179 whereupon spring 187 will draw trigger 184 downwardly until stopped by surface 190 contacting a projection 192 of the bracket 186.

Downward movement of trigger 184, however, will cause projection 188 to disengage the projection 6, of lever 7, from the program bar 1 (securing the carriage in columnar position as previously described), whereupon the carriage 4 will be free to move, under the influence of spring tensioned drum 8, until stopped by the projection 6 engaging the notch 2 in the program bar 1, corresponding to the next columnar position, said engagement being adapted to operate the register selecting mechanism as previously described.

During the above movement of the carriage the surface 193 of the program bar 1, will contact the surface 194 of trigger 184, to rock said trigger from the projection 192 of bracket 186 and free projection 188 from projection 6.

Near the completion of an operating cycle a projection 370 of crank arm 155 (Fig. 12) will contact an arm 371 of lever 150 and rock said lever into the path of movement of projection 372 of pawl 153 to disengage said pawl from driving disc 157 while a carriage shift is taking place.

Suitable locking means are provided as hereinafter described to secure engagement of lever 150 with projection 372 until after a carriage shift movement is completed.

Means for automatically line spacing and returning the carriage

As shown in Fig. 13 a bar 195, similar in construction to the program bar 1, extends transversely of the carriage and is provided with cam shoes 196, adapted to control the action of means for returning the carriage to its initial position. A cam shoe 196 is so positioned upon the active flange of bar 195 that, as the carriage is shifted to the extreme left hand position desired, this shoe will be brought to rest upon a roller 197, fast to an arm 198 secured to a square shaft 199 as shown in Fig. 2.

As the cam shoe 196 was brought to rest upon roller 197 cam surface 200 (Fig. 13) will have rocked said roller downwardly and shaft 199 will be rocked counter-clockwise, as viewed in Fig. 4.

Secured to the shaft 199 is an arm 201 (Figs. 2 and 4) provided with a stud 202 having engagement with a bell crank lever 203 and adapted to rock said bell crank lever counter-clockwise.

This movement of bell-crank lever 203 will cause the arm 204 of said lever to impart counter-clockwise movement (Fig. 2) to a bell lever 205 pivotally secured at 206 to the rear frame of the machine.

An arm 207 of bell lever 205 has engagement with a lever 208, pivotally mounted inside the rear frame of the machine, upon stud 209. Stud 209 extends through the frame and has secured thereto an arm 210 held in its lowered position, shown in Fig. 2, by means of spring 211.

Counter-clockwise movement of bell lever 205 will cause the arm 207 of said lever to rock lever 208 and arm 210 clockwise about point 209 to cause a projection 212 of said arm to contact the cam surface 213 (Fig. 12) of a latch 214, pivotally mounted at 215 upon the bracket 186, and to rock said latch counter-clockwise out of the path of movement of a bar 216 extending transversely of the machine and pivotally mounted upon the left and right hand framing of the carriage.

Bar 216 is normally held in raised position by means of a roller 217 secured to the arm 179, said arm being adapted to be operated by the reciprocating movement of the cam 316 as previously described.

During the forward excursion of cam 316 the cam 179 will be rocked downwardly and, latch member 214 being out of the path of movement of bar 216, said bar will be free to move downwardly and allow pawl 814 (Fig. 21), through action of spring 880, rigid lever extension 818 of bar 216 (fulcrumed at 819), link 816 and arm 815, to rise and engage with the platen ratchet 820. The return movement of the parts will act to restore the link 816 to normal position, advancing the platen and disengaging the pawl 814.

A projection 280 (Fig. 2) of the lever 210 will meanwhile, during the above described movement of said lever, contact surface 281 of latch 182 and move the surface 181 of said latch out of the path of movement of projection 180 of lever 179 to render inoperative the carriage escapement means previously described.

Secured to the square shaft 199 is an arm 218 (Figs. 2, 12 and 14) adapted during the clockwise movement of said shaft to tension a spring 219 (Fig. 14) secured to one end of a link 220. The opposite end of link 220 is pivotally connected at 221 to a latch 222, pivotally mounted upon a plate 223, pivotally secured at 62 to the bracket 29 (Fig. 12).

As shown in Fig. 14, latch 222 is held by tension of spring 219 against a roller 224 fast to the lever 163, and as said lever is rocked during the forward movement of cam 316, as previously described, hook end 225 of said latch will be moved into the path of the return movement of roller 224.

Upon completion of the operating cycle of the machine roller 224, in returning to its normal position, will engage the hook end 225 of latch 222 and cause plate 223 to be rocked upwardly about point 62, to engage clutch means for returning the carriage, in the following manner:

Plate 223 has connection through a flexible link 226 with a clutch operating member 227, provided with projections 228 having engagement with suitable slotted indentures of a pair of discs 229 (Figs. 14, 15, 16 and 17) loosely mounted upon a sleeve 230 secured to the shaft 231 of the carriage return clutch mechanism shown in Fig. 15.

A bracket 232 (Figs. 14 and 16) suitably secured to the casing of the clutch member, acts as a fulcrum for the clutch operating member 227 and as plate 223 is rocked upwardly, flexible coupling 226 will be tensioned, to impart a twisting movement to said operating member, and projections 228 will tend to impart lateral movement to the discs 229.

Lateral movement of the discs 229 is adapted through suitable ball thrust bearings 233 (Fig. 15) to cause frictional engagement of plate 234, keyed to the clutch shaft 231, with a drum 235, loosely mounted upon a bearing 236 supported by the bracket 237.

During the above-described operation of plate 223 an insulated roller 238 (Fig. 11) mounted thereon, will contact the points 64 of switch 65 to close an electrical circuit to motor 48, whereupon said motor (Fig. 15) through gears 53, 52, 51, 50, 49, shaft 47, gears 239, and 240, shaft 231 and plate 234, will rotate drum 235 and ribbon tape 241, suitably secured to said drum and at 242 (Fig. 13) to the frame 3 of the carriage, will cause return movement of said carriage, until stopped by a suitably placed cam shoe 196 in the following manner.

As the carriage is brought to its initial position the surface 243 (Fig. 13) of a cam shoe 196 will rock the roller 197 upwardly to impart counter-clockwise movement to shaft 199.

Counter-clockwise movement of shaft 199 will cause a pin 244 (Fig. 14) fast to the lever 218 to move link 220 downwardly and disengage hook end 225 from roller 224 to release plate 223, and clutch operating arm 227 will release plate 234 from drum 235.

*Means for changing the program arrangement*

Program bar 1, tubular bar 82 and the bar 195 are pivotally secured to the framing of the carriage and are adapted to be set to either of four positions, corresponding to four different program arrangements, by means of a thumb knob 245 secured by pin and slot engagement 265 to the shaft 16 of the program bar 1, as shown in Figs. 3 and 13.

Knob 245 has formed integral therewith a gear sprocket 261 having engagement, by means of chain 262, with sprocket members 250 and 256 secured to the bars 82 and 195 respectively.

To change the program arrangement knob, 245 is merely moved slightly laterally (to disengage pin 17 from aperture 18 of the hub 15 operated by thumb lever 13) and rotated 90° to bring differently arranged sets of apertures 2, holes 81 and cam shoes 196 into operating position.

To facilitate the interchanging of additional bars 1, 82 and 195 (to provide for additional program arrangements) said bars are so secured to the framing of the carriage as to be quickly and easily removed in the following manner:

Mounted upon the shaft 16 of program bar 1 is a bearing 246 (Figs. 3 and 4) provided with oppositely disposed projections 247, said bearing being adapted to be inserted into a suitable aperture 260 cut in the frame 4 of the carriage and locked therein by rotating 90°, the tension exerted by spring 248 being sufficient to secure the bearing in said position.

The hub 249 of sprocket 250 is secured to the inner wall of tubular bar 82 by means of an expansion nut 251, as shown in Fig. 3. A spring tensioned combination latch and positioning lever 252 (Figs. 3 and 12) pivotally secured to the frame 4 of the carriage, is provided with a projection 253 adapted to engage a shoulder 254 of hub 249 and lock the tubular bar 82 in a suitable orifice cut in the frame 4.

The bar 195 may be taken bodily from the machine by merely removing the screw 255 (Fig. 13) securing the sprocket 256 to the shaft 257 of said bar and moving the bar, toward the left as viewed in Fig. 13, against tension of spring 258, until projection 259 is free of frame 3, whereupon bar 195 may be moved to the right removing shaft 257 from frame 4.

The bars 1, 82 and 195 are merely supported upon the frame 3 of the carriage by suitable orifices cut in said frame, as clearly indicated.

*Special operations*

The following special means are provided to prevent an operating cycle of the machine while a carriage shift and subsequent register selecting cycle is taking place.

As previously described upon completion of an operating cycle of the machine projection 370 of crank arm 155 (Fig. 12) will engage projection 371 of lever 150 imparting clockwise movement to said lever. This clockwise movement of lever 150 is sufficient to rock its projection 267 from beneath the projection 276 of a lock lever 275, pivotally mounted at 341 upon the bracket 29 as shown in Fig. 3. Release of lock lever 275 will cause said lever under influence of spring 277 to be rocked downwardly into engagement with a projection 266 of plate 33. Lever 275 will thus be positioned opposite the projection 267 of lever 150 to prevent effective operation of keys 138, 139 and 283 and opposite the end 268 of a lever 269 to prevent movement of said lever thus locking (through link 270 and lever 271) the total and sub-total keys 278, 361 and 273.

As plate 33 is caused to be moved upwardly by spring 35 (upon completion of a carriage shift), to initiate a register selecting cycle, the projection 266 of said plate will relatch the lock lever 275 upon projection 267. However, projection 266 will now be positioned opposite projections 267 and 268 and the operating keys will continue to be locked until plate 33 is restored upon completion of the registering cycle as previously described.

An alternative operating key 283 (Figs. 1 and 10) is also provided, pivotally mounted upon the right hand framing of the machine and located adjacent the bar 138, adapted when operated in normal manner (depressed and immediately released) in lieu of the bar 138, to set the line spacing mechanism, while disabling the carriage shifting mechanism, so that the carriage may remain in any set columnar position.

Key 283 is provided with a rearwardly extended portion 284 (Fig. 14) having engagement with a lever 285 secured to the square shaft 199. A pin 286 secured to the key 283 overlies the stem of bar 138 (Fig. 10) and upon depression of said key will operate bar 138 to initiate an operating cycle of the machine.

Depression of key 283 will also rock lever 285 and shaft 199 clockwise thereby setting the line spacing mechanism while disabling the carriage escapement mechanism.

A suitable spring latch 350 is provided adapted to hold the lever 285 and shaft 199 in rocked position for sufficient time to allow bar 216 (Fig. 12) of the line spacing mechanism to move below latch 217 and projection 180 (Fig. 2) of the carriage shift mechanism to move past cooperating position with the latch 182.

Pivotally mounted upon latch 350 is a spring flipper 351 adapted by cooperation with a pin 352, secured to the arm 163, to rock latch 350 and release lever 285 prior to the engagement of roller 224 with hook 225 of the carriage return mechanism thus rendering said mechanism inoperative.

As previously described, upon completion of an operating cycle of the machine locking latch 275 and projection 266 of plate 33 are adapted to render ineffective the operation of keys 278, 361, 273, 138, 139 and 283 until completion of a register selecting cycle. However, since a register selecting cycle is dependent upon the lateral movement of the carriage and in the above-described operation the carriage will have remained in its original position, the following means are provided whereby lock 275 will be restored, to release said keys, upon completion of an operating cycle, when key 283 is operated and immediately released.

Pivotally secured to latch 350 is a link 373 (Fig. 14) having engagement by slotted opening 374 (Fig. 3) with lock lever 275. As latch 350 is caused to be rocked by engagement of pin 352 with flipper 351 upon return movement of arm 163, link 373 will lift lock arm 275 to normal position upon the projection 267 of lever 150 (Fig. 12).

The following means are provided whereby if key 283 is held depressed, hook 225 will engage roller 224 to operate the carriage return means, in which case a line spacing operation would occur and the carriage would start to return to its initial position, at which time key 283 may be released.

As the carriage reaches its initial position cam shoe 196 (Fig. 13) in contacting roller 197 will restore shaft 199 and lever 285 to normal position against tension of spring latch 350.

The above-described restoring means would impart sufficient kick to the key 283 to restore same (under normal pressure) if said key were to be continued to be held depressed at this time and in any case would serve as a signal to release the key, whereupon shaft 199 would be free to rock and allow the carriage to complete its return movement.

Key 283 is provided with an arm 375 adapted, when said key is held in depressed position, to engage projection 376 of flipper 351 and hold said flipper out of the path of movement of the pin 352, to render the restoring means for lock bar 275 ineffective at this time.

As previously described normal operation of bar 138 (Fig. 10) is adapted to initiate an operating cycle of the machine, upon the completion of which the carriage will tabulate to the next columnar position.

The following means are provided however, whereby if bar 138 is depressed and held in depressed position the carriage at the completion of an operating cycle will pass through the next columnar position and locate in a succeeding position.

As shown in Fig. 10 a rearwardly extending arm 353 of the stem for bar 138 has engagement with an arm 354 of a latch plate 355 pivotally mounted upon a bracket 356 secured to the rear framing of the machine (Fig. 2).

As previously described, near the completion of an operating cycle trigger 184 will release projection 6 of lever 7 from engagement with the program bar 1 and the carriage will start its shifting movement to the next columnar position.

If bar 138 is held depressed at the time lever 7 is rocked however, latch plate 355 will be rocked, under influence of spring 357, beneath arm 358 of lever 7, thereby holding said lever in operated position. The carriage will now continue its shifting movement until a suitably placed pin 359 secured to the program bar 1 contacts the cam surface 360 of said plate rocking same from beneath arm 358, whereupon projection 6 of lever 7 will engage the desired notch 2 of program bar 1.

Total and sub-total keys 278 and 273 (Fig. 1) are provided, adapted to operate totalizing means fully described in the aforementioned applications. At the completion of a totalizing operation the carriage will tabulate to the next columnar position in the manner described for normal operation of bar 138.

An alternative total operating key 361 (Figs. 1 and 14) is provided however, adjacent key 278, adapted as hereinafter described to control means for returning the carriage to its initial columnar position upon completion of a totaling operation.

Key 361 is suitably secured to the framing of the machine by pin and slot engagement 362 and is pivotally secured at its lower end to one arm of a bell crank lever 363 fulcrumed upon the framing at 364.

Pivotally secured to the other arm of bell crank 363 is a link 365 supported at its rearward end by slot engagement with stud 62. Link 365 is provided with a projection 366 having engagement with the lever 285 secured to square shaft 199.

A hookarm 367 of key 361 overlies pin 368 secured to the stem of total key 278 and is adapted as key 361 is operated to depress key 278, thereby initiating a totalizing operation, upon the completion of which, the carriage would normally tabulate to the next columnar position as previously described. However, key 361 in being depressed will have also rocked bell crank lever 363 and link 365 will be moved rearwardly to rock lever 285 and shaft 199.

As previously described shaft 199 when rocked will set the line spacing mechanism, render the tabulating mechanism ineffective and tension spring 219 for engaging hook 225 with roller 224 controlling operation of the carriage return mechanism.

As fully described in the aforementioned patents the total key 278, and consequently key 361 (held depressed by engagement of hook 367 with pin 368) will be restored to normal at the completion of a total cycle of operation. However, roller 224 will have engaged hook 225 prior to the release of said keys to render operative the carriage return mechanism.

Since in total or sub-total taking one register only may be in engaged position, and since said register must be engaged additively, suitable means are provided to lock keys 278, 361 and 273 when more than one register is engaged, or if a register is engaged subtractively or all registers are at non-add position.

As shown in Fig. 4, an arm 288, pivotally secured at 289 to the framing of the machine, is supported at its forward end upon the segments 126.

Pivotally secured at 290 to arm 288 is a lever 291, having engagement at the upper end thereof with a stud 292 secured to a bell crank lever 293, fulcrumed at 294 upon the under side of the keyboard plate (Fig. 1). Bell crank lever 293 has engagement with a bar 295 adapted, when more than one register is engaged or when the registers are in non-add or subtract positions, to lock the keys 278, 361 and 273.

Operation of a segment 126 to engage its related register 77 or 78 in the add position (see Fig. 4, wherein all the segments are shown in add position) will however cause a projection 296 of lever 291 to contact a pin 297 of segment 105 related to register 76 (when said segment is down, in the non-add position) and rock lever 291, bell crank 293 and bar 295 to unlock keys 273, 278 and 361, projection 296 coming to rest opposite pin 297 and holding bar 295 free of keys 273 and 278. If the segment 105 is in operated (add or subtract) position, however, pin 297 will be out of cooperative position with projection 296, and keys 273, 278 and 361 will remain locked.

Manually settable means 299 (Fig. 4) are provided, adapted by positioning surface 300 opposite the path of movement of lever 86 (supporting the plunger 83 controlling register 76) to lock the control means for said register in non-add position. Register 76 will thus remain out of engagement and a total may be taken of either register 77 or 78 at any columnar position of the carriage wherein bar 82 allows the particular register to be engaged and maintains the other register in non-add position.

A total of register 76 is adapted to be taken at a certain columnar position of the carriage, wherein the register control means previously described will provide for the registers 77 and 78 being moved to non-add position and register 76 to add position.

In the adjustment of register 76 to add position (registers 77 and 78 being in non-add position) a pin 125, secured to segment 105, will unlock the keys 273, 278 and 361.

Means for printing values in blue ink when register 76 is operated additively or in red ink when said register is operated negatively are also provided as follows:

Segment 105 (Fig. 4) is provided with an arm 302 having secured thereto an eccentric stud 303, adapted to engage the surface 304 of a cam lever 305, secured to a shaft 306, extending transversely of the machine and suitably mounted in the framing thereof.

A lever 307 (Fig. 10) secured to the opposite end of said shaft, has a stud 308 adapted to cooperate with a projection 309 of a lever 310, pivotally mounted upon the rocker 140 operable, as hereinafter described to cause said lever 310 to position the end 311 of a lever 312 (pivotally mounted at 313 upon the framing of the machine and provided with a pin 314 engaging surface 315 of lever 310) to operative or inoperative position relative to the projection 316ª of a slide 317.

Slide 317 is secured by pin and slot engagement 318 (Fig. 22) to brackets 319, suitably secured to the rear frame of the machine, and is tensioned toward the right (as viewed in Fig. 22) by means of spring 320ª.

A bell crank lever 321ª pivotally mounted at 322ª upon bracket 319 has one arm adapted to engage a projection 324 of slide 317 and its other arm in engagement with the bifurcated end 323 of a lever 344 (Fig. 23), pivotally mounted at 325ª upon bracket 319 as shown in Fig. 23. An arm 326 of lever 344 has engagement with a pin 327 secured to an arm 328 fast to the shaft 164, and as said shaft is rocked during an operative cycle of the machine, as previously described, pin 327 will fall away from arm 326 of lever 344.

If end 311 of lever 312 (Fig. 10) is in raised position, the projection 316ª of slide 317 will contact with said end and slide 317 will be held toward the left in the position illustrated in Fig. 22, and the type ribbon (supported from slide 317) will be in lowered position, with the blue portion 323ª thereof opposite the printing line. However, if projection 309 is positioned above pin 308 the end 311 of lever 312 will be in its lower position, and the indenture 348 of said lever will be opposite projection 316ª of slide 317, whereupon said slide will be free to move toward the right, under influence of the spring 320ª.

Secured to slide 317 are pins 329 and 330, having engagement with the walls of angularly disposed slots 331 and 332 of a frame 333 provided with hairpin type ribbon guide members 334. As slide 317 is moved toward the right, pins 329 and 330 will cam frame 333 upwardly to raise the type ribbon, bringing the lower or red ink portion 335 thereof to the printing line.

Pin 308 (Fig. 10) is adapted to be moved by the segment 105 to either of three positions, corresponding to the non-add, add or subtract positions of said segment. The projection 309 of lever 310 is adapted to be moved forward or rearwardly of its normal position by operation of bell crank lever 140, said lever being rocked rearwardly when minus key 139 is depressed and forwardly upon operation of the non-add means described in the aforementioned application 518,061.

As diagrammatically illustrated in Fig. 24, projection 309 is only positioned upon the pin 308 at such times as the registers are to be operated negatively.

Upon completion of an operating cycle of the machine, shaft 164 will rock arm 328 upwardly, pin 327 will rock lever 344, bell crank 321ª will contact projection 324 of slide 317, restoring said slide to normal position, and pins 329 and 330 will cam frame 333 to normal position, restoring the blue inked portion 323ª of the type ribbon to the printing line.

I claim:

1. In a listing calculator having a transversely shiftable record carriage, a register, and means for determining the activity of said register and the character of the registration thereon; control means including a unitary member provided with a plurality of alternatively active series of graded contact surfaces each series adapted to differentially control the activity and character determining means in different columnar positions of the carriage in accordance with a distinct program, said member being adapted for adjustment to bring a given series of contact surfaces into active position.

2. In a listing calculator having a transversely shiftable record carriage, a register, and means for determining the activity of said register and the character of the registration thereon; control means including a rotary member provided with a plurality of alternatively active radially disposed series of graded contact surfaces each series adapted to differentially control the activity and character determining means in different columnar positions of the carriage in accordance with a distinct program and means for releasably holding said member in one of several angularly adjusted positons, to bring a given series of contact surfaces into active position.

3. In a listing calculator having a transversely shiftable record carriage, a register, and means for determining the activity of said register and the character of the registration thereon; control means including a device having a plurality of alternatively active series of graded contact surfaces each series adapted to differentially control the activity and character determining means in different columnar positions of the carriage in accordance with a distinct program, and a manually settable member adapted to adjust the control devices to bring a given series of contact surfaces thereof into active position.

4. In a listing calculator having a transversely shiftable record carriage, a register, means for determining the character of the registration thereon, and operating means including an electric motor; control means adapted to differentially control the character determining means in different columnar positions of the carriage, power connections between the control means and the motor, and means between the carriage and the power connections for placing said connections in active condition.

5. In a listing calculator having a transversely shiftable record carriage, a register, and means for determining the character of the registration thereon; control means adapted to differentially control the character determining means in different columnar positions of the carriage, power means for operating the control means, and a normally restrained member, releasable by the carriage, for placing the power means in active condition.

6. In a listing calculator having a transversely shiftable record carriage, a register, and means for determining the character of the registration thereon; control means adapted to differentially control the character determining means in different columnar positions of the carriage, power means for operating the control means, a normally restrained member releasable to place the power means in active condition, and a second normally restrained member releasable by the carriage and operable thereupon to release the first named restrained member.

7. In a listing calculator having a transversely shiftable carriage, a register, and means for determining the activity of said register and the character of the registration thereon; means adapted to differentially control the character determining means in different columnar positions of the carriage, including an abutment member mounted upon said carriage and having graded marginal portions, and a shouldered plunger movable into selective contact with said member.

8. In a listing calculator having a transversely shiftable carriage, a plurality of registers, and means for determining registration in certain of the several registers; means adapted to differentially control the registration determining means of each of said registers, in different columnar positions of the carriage, including a differential element mounted upon said carriage and elements related each to a different register and collectively disposed for contact with said first named element at points lying in a plane parallel with the plane of carriage movement.

9. In a listing calculator having a transversely shiftable record carriage, a register, means for determining the character of the registration thereon, and means for shifting the carriage; control means including a device having a plurality of alternatively active series of graded contact surfaces, each series adapted to differentially control the registration determining means in different columnar positions of the carriage in accordance with a distinct program, control means including a device having a plurality of alternatively active series of contact surfaces each series adapted to arrest the carriage successively in different columnar positions in accordance with a distinct program, and a member common to the two control means and settable to bring a given series of contact surfaces of each device into active position.

10. In a listing calculator having a transversely shiftable record carriage, a plurality of registers, means for determining registration in certain of the several registers, and means for shifting the carriage in one and in the other direction; control means including a device having a plurality of alternatively active sets of graded contact surfaces each set adapted to differentially control the registration determining means in different columnar positions of the carriage in accordance with a distinct program, control means including a device having a plurality of alternatively active sets of spaced contact surfaces each set adapted to operate the shifting means differentially to provide for movement of the record carriage back and forth between selected columnar positions thereof in accordance with a distinct program, and a member common to the two control means and settable to bring a given set of contact surfaces of each device into active position.

11. In a listing calculator having a transversely shiftable record carriage, a register, means for determining the character of the registration thereon, and means for shifting the carriage in one and in the other direction; control means including a device having a plurality of alternatively active sets of graded contact surfaces each set adapted to differentially control the character determining means in different columnar positions of the carriage in accordance with a distinct program, control means including a device having a plurality of alternatively active sets of spaced contact surfaces each set adapted to operate the shifting means differentially to provide for movement of the record carriage back and forth between selected columnar positions thereof in accordance with a distinct program, and a member common to the two control means and settable to bring a given set of contact surfaces of each device into active position.

LORING P. CROSMAN.